US012576854B2

(12) United States Patent
    Krueger

(10) Patent No.: US 12,576,854 B2
(45) Date of Patent: Mar. 17, 2026

(54) METHOD AND ASSISTANCE SYSTEM FOR AUTOMATIC NOISE OPTIMIZATION, AND MOTOR VEHICLE

(71) Applicant: Bayerische Motoren Werke Aktiengesellschaft, Munich (DE)

(72) Inventor: Henry Krueger, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/724,990

(22) PCT Filed: Jan. 13, 2023

(86) PCT No.: PCT/EP2023/050677
    § 371 (c)(1),
    (2) Date: Jun. 27, 2024

(87) PCT Pub. No.: WO2023/151886
    PCT Pub. Date: Aug. 17, 2023

(65) Prior Publication Data
    US 2025/0065882 A1      Feb. 27, 2025

(30) Foreign Application Priority Data
    Feb. 11, 2022    (DE) ..................... 10 2022 103 270.1

(51) Int. Cl.
    *B60W 30/20*          (2006.01)
    *B60W 50/00*          (2006.01)
(52) U.S. Cl.
    CPC ..... *B60W 30/20* (2013.01); *B60W 2050/0088* (2013.01); *B60W 2420/54* (2013.01)
(58) Field of Classification Search
    CPC ....... B60W 2420/54; B60W 2050/088; B60W 30/20
    See application file for complete search history.

(56) References Cited

U.S. PATENT DOCUMENTS

2008/0120011 A1    5/2008  Iwase et al.
2013/0035832 A1    2/2013  Nozu et al.
                  (Continued)

FOREIGN PATENT DOCUMENTS

DE          100 62 349 A1    6/2002
DE    10 2014 206 048 A1    10/2014
                  (Continued)

OTHER PUBLICATIONS

International Search Report (PCT/ISA/210) issued in PCT Application No. PCT/EP2023/050677 dated Mar. 23, 2023 (3 pages).
                  (Continued)

*Primary Examiner* — Kevin A Lathers
(74) *Attorney, Agent, or Firm* — Crowell & Moring LLP

(57)              ABSTRACT

A method for optimizing noise in a motor vehicle includes automatically, during operation of the motor vehicle, capturing and analyzing acoustic signals for acoustic excess. In response to detecting acoustic excess, a current load requirement and a current operating parameter value for a motor vehicle system that complies with the load requirement are captured. The operating parameter is varied, with continued compliance with the load requirement, by a self-learning adaptation device to reduce the acoustic excess. In response to the reduction of the acoustic excess, a corresponding new operating parameter is set as a new operating strategy for the system for complying with the respective load requirement. The new strategy is set to be used in response to the occurrence of the respective load requirement. The noise optimization is performed in a predefined optimization operating mode of the motor vehicle in which different predefined load requirements are run through in a predefined program.

9 Claims, 1 Drawing Sheet

(56)     References Cited

U.S. PATENT DOCUMENTS

| 2020/0101975 A1 | 4/2020 | Suzuki | |
| 2020/0109672 A1* | 4/2020 | Lee | F02D 41/26 |
| 2021/0115834 A1* | 4/2021 | Hashimoto | G06N 20/00 |

FOREIGN PATENT DOCUMENTS

| DE | 10 2017 213 131 A1 | 1/2019 |
| DE | 10 2018 117 908 A1 | 1/2019 |
| DE | 10 2018 118 155 A1 | 1/2019 |
| DE | 10 2018 221 998 A1 | 6/2020 |
| DE | 10 2020 119 700 A1 | 1/2022 |
| EP | 3 809 340 A1 | 4/2021 |
| EP | 3 932 727 A1 | 1/2022 |
| WO | WO 2020/207405 A1 | 10/2020 |

OTHER PUBLICATIONS

German-language German Search Report issued in German Application No. 10 2022 103 270.1 dated Sep. 7, 2022, with partial English translation (7 pages).

* cited by examiner

METHOD AND ASSISTANCE SYSTEM FOR AUTOMATIC NOISE OPTIMIZATION, AND MOTOR VEHICLE

CROSS REFERENCE TO RELATED APPLICATION

This application is a 371 of International Application No. PCT/EP2023/050677, filed Jan. 13, 2023 which claims priority under 35 U.S.C. § 119 from German Patent Application No. 10 2022 103 270.1, filed Feb. 11, 2022, the entire disclosure of which is herein expressly incorporated by reference.

BACKGROUND AND SUMMARY

The present invention relates to a method and an assistance system for optimizing noise in a motor vehicle. The invention also relates to an accordingly configured motor vehicle.

Noises which can be perceived by vehicle occupants as disruptive or distracting may arise during operation of a motor vehicle. This may adversely affect usage comfort or occupant comfort of the motor vehicle. In addition, corresponding vibrations may possibly lead or contribute to damage or increased wear. The occurrence of such noises or corresponding vibrations can possibly be counteracted by a more solid design of components that are susceptible to vibration, by way of additional fastening points or by way of additional damping material if components or operating points that are problematic with regard to the production of noise have already been identified during vehicle development. However, not all noise or vibration problems are often identified and permanently solved, on the one hand, and an accordingly increased outlay in terms of material, manufacturing and costs may arise and a weight of the motor vehicle may possibly be increased in an undesirable manner, on the other hand.

Against this background, DE 100 62 349 A1 describes a method for controlling a load of a vehicle. The current load is determined therein on the basis of an operating variable and controlled by means of a control unit. The latter is carried out on the basis of a noise level resulting from the current load. The noise emission or noise radiation caused by the vehicle is therefore intended to be improved.

As a further example, US 2013/0 035 832 A1 describes a control device for distributing a drive force of a vehicle. There, it is determined when a rotational speed of an output shaft of an engine of the vehicle is in a range in which abnormal noises can be generated. A value of a torque that is intended to be transmitted to alternatively driven wheels of the vehicle is then set such that the abnormal noise can be reduced.

EP 3 932 727 A1 describes a method for processing a torque of a vehicle. Torque is assigned therein to a first drive system and to a second drive system on the basis of a required torque. The torque output of the first drive system is adapted on the basis of the required torque and a maximum torque of the second drive system if an intrinsic frequency of the first drive system is in a resonant frequency range.

DE 10 2020 119 700 A1 describes a method for actively suppressing interfering noises of a vehicle having an electrical drive machine. Operating information relating to a temporal profile of a current and/or a voltage, which is used to operate the drive machine, is determined therein. A compensation signal for at least partially suppressing an interfering noise caused by the operation of the drive machine is then generated on the basis of the operating information. Corresponding interfering noises are therefore intended to be reduced or suppressed in a particularly reliable manner.

DE 10 2018 221 998 A1 describes a method for generating a noise database. An acoustic signal from a motor vehicle and a parameter of the motor vehicle or its environment, which is assigned to the acoustic signal in terms of time, are captured therein. A data record containing the parameter and the signal and/or a physical property of the signal as entries is also generated. This data record is then stored in the noise database. The intention is therefore ultimately to improve driving comfort and increase traffic safety.

DE 10 2014 206 048 A1 describes a method for operating an electric motor in a system, for example a motor vehicle. A correction signal for changing the operating noise of the system at at least one predefinable frequency is determined therein from a frequency-dependent response function of the system. This correction signal is then used to control the electric motor. The intention is therefore to specifically adapt the acoustic characteristic of the electric motor.

As a further approach, US 2008/0 120 011 A1 describes a control device for a vehicle comprising an internal combustion engine and an electric motor. The control device has noise reduction means for controlling the electric motor. The intention is therefore to reduce noise caused by changes in the output torque of the internal combustion engine. For this purpose, the electric motor is controlled in such a manner that it generates a torque that is varied in the opposite phase. The intention is therefore both to reduce noise and to improve fuel efficiency.

A further method for controlling torque is described in WO 2020/207 405 A1. A torque distribution for a first drive system and a second drive system is carried out therein according to a torque requirement. If a characteristic frequency of the first drive system falls in a resonant frequency range of the first drive system at a current vehicle speed, the torque output of the two drive systems is modified according to the torque requirement and a maximum torque of the second drive system. In this case, the torque output of the first drive system is reduced and the torque output of the second drive system is increased.

An object of the present invention is to improve usage comfort and an acoustic behavior of a motor vehicle in a particularly efficient manner.

At least this object is achieved, according to the invention, by the one or more embodiments disclosed herein.

The method according to at least one embodiment can be used to optimize noise in a motor vehicle, in particular automatically or semi-automatically. This optimization can be carried out, for example, with regard to at least one predefined criterion. In particular, interfering excesses, that is to say interfering noise peaks, can be avoided or reduced. The method can be used during operation of the respective motor vehicle with operation of at least one system or of at least one component for the motor vehicle. The motor vehicle may therefore already have been manufactured. In another case, a similar method can also be used, for example, during the development phase or even before final assembly of the motor vehicle.

In one method step of the method according to at least one embodiment, acoustic signals are captured during operation of the motor vehicle with operation of the at least one system for the motor vehicle and are analyzed for acoustic excesses. Such acoustic signals may be or comprise, for example, sound signals, that is to say airborne or structure-borne sound, vibrations and/or the like. In the present sense, acoustic excesses may be, for example, peaks in a respective frequency spectrum, in particular peaks which project beyond a predefined threshold value or are higher by at least a predefined value or amount than surrounding regions of the respective spectrum. The acoustic signals may be detected, that is to say identified, for example, by means of a Fourier transform, in particular according to the FFT method, a threshold value comparison, a determination of sound energy in certain predefined frequency or spectral ranges and/or the like.

If an acoustic excess is detected, a current load requirement for the motor vehicle or the respective system and at least one current operating parameter value for the at least one system of the motor vehicle or for at least one operating parameter of at least the system that complies with the load requirement are captured or determined. Such a system may be provided or configured for a specific functionality of the motor vehicle, for example a drive, a ventilation system, a cooling system and/or the like. Such a system may comprise one or more devices, apparatuses, components, control devices and/or the like. In particular, the system may comprise at least two controllable devices or components. The current load requirement may apply to precisely this system, at least one other system or the motor vehicle as a whole. A load requirement may be triggered or determined, for example, by a setting or operating action of a driver or occupant of the motor vehicle or, for example, an operator of the system or of a corresponding test bench or the like. The operating parameter value may be a value of an operating parameter of the respective system, for instance an output torque, a rotational speed, a power, a switching or control frequency, a duty ratio and/or the like. In other words, a state of the motor vehicle at a respective time at which the acoustic excess occurs is therefore determined.

In a further method step of the method according to at least one embodiment, the at least one operating parameter value is varied, with continued compliance with the load requirement, by a self-learning adaptation device in order to reduce or minimize the acoustic excess. The adaptation device may be or comprise, for example, a machine learning or artificial intelligence device, for example an artificial neural network, a pattern recognition algorithm and/or the like. In particular, the adaptation device may be in the form of a corresponding software module or may comprise, for example, a processor device, for instance a microchip, a microcontroller or a microprocessor or the like, and a data memory which is coupled thereto and stores a corresponding software module or computer program. The adaptation device can therefore automatically vary, that is to say change, the at least one operating parameter value and can then check whether or not the acoustic excess has changed, in particular has been reduced. The adaptation device may be part of the motor vehicle. For example, the adaptation device may be in the form of a control device of the motor vehicle or for the motor vehicle or may be integrated in such a control device. The adaptation device may likewise be a separate device, for example a control device or the like which can be used when developing or testing the system before installation in the motor vehicle.

The at least one operating parameter value can be automatically varied, for example, to such an extent or until the acoustic excess has been eliminated or falls below a predefined threshold value and/or a respective, in particular predefined, scope for variation, within which the operating parameter value can be varied, has been exhausted. A corresponding threshold value may be predefined, for example in a frequency-dependent manner and/or relative to other frequencies or spectrum ranges, for corresponding sound powers or volumes and/or the like. The scope for variation may be individually specified or predefined for each operating parameter value, for example. This makes it possible to ensure that, when varying the operating parameter value, limits of a specification or of safe operation or predefined emission or energy consumption limits are complied with, that is to say are not exceeded.

Depending on the configuration or implementation, the at least one operating parameter value can be automatically varied, for example, according to a predefined scheme, on the basis of a change in the respective acoustic excess that is achieved thereby or a sum of a plurality of or all detected acoustic excesses, randomly or according to a pattern or scheme automatically learnt by the adaptation device itself. The latter may be carried out, for example, on the basis of a predefined reward function which rewards variations that lead to a particularly great or effective reduction in the acoustic excess, with the result that such variations are learnt and preferably used.

If the acoustic excess is or has been reduced accordingly, in a further method step of the method according to at least one embodiment, the corresponding new, that is to say changed, operating parameter value is learnt as a new operating strategy for the system for complying with the respective requirement and is automatically used, that is to say set, if the respective requirement occurs in future, thus avoiding future or renewed occurrence of the respective acoustic excess at the respective operating point, that is to say for the respective load requirement. This new operating strategy can be learnt by the self-learning adaptation device and/or the respective system whose operating parameter value has been changed. Adaptive, self-learning noise optimization during operation is therefore provided in the present case, during which the adaptation device determines and learns suitable settings, that is to say operating parameter values, by correlating acoustic effects and recorded state data, that is to say in particular the at least one operating parameter value and possibly also the current load requirement, in order to avoid or reduce acoustic annoyances or interference. The method according to at least one embodiment is used during operation of the motor vehicle, with the result that its acoustic properties can therefore be optimized live. If a similar method is used during separate operation of the at least one system, this system may therefore already be characterized in advance, that is to say before use in the motor vehicle. This can already enable optimization in an accordingly early vehicle production method. For example, it is then possible not only to adapt the operating strategy of the system, but also to modify or adapt the design of the system or at least one further device for the motor vehicle or a design of the motor vehicle. It is therefore possible to accordingly react to the acoustic or vibratory properties of the at least one system in good time and therefore in a particularly flexible, practical, cost-effective and effective manner. For example, it can therefore be identified that the system generates noise or excitation peaks at a particular operating point or in a particular frequency range, and a structure or design of the motor vehicle can be configured on the basis of this in order to damp this or minimize corresponding excitations of further components by the system.

In at least one embodiment, the noise optimization is performed in a predefined optimization operating mode of the motor vehicle. In this optimization operating mode, different predefined load requirements or corresponding operating points are run through, that is to say set, in a predefined program. Such an optimization operating mode or a corresponding program can be executed, for example, in a consistent predefined manner on a roller test bench for the motor vehicle. For example, the motor vehicle or at least one system of the motor vehicle can be activated, that is to say operated, from a minimum load or minimum power to a maximum load or maximum power. The noise optimization can be performed in each case as required or regularly, for instance during repair or maintenance or as part of an inspection service or the like. It is therefore possible to ensure that acoustic excesses are reliably detected. In addition, the motor vehicle can be deliberately operated, for example, with a specific load requirement, for which an acoustic excess was detected, until the corresponding noise optimization, that is to say the optimization of the at least one operating parameter value for minimizing the acoustic excess, has been completed. An accordingly comfortable acoustic behavior of the motor vehicle during normal usage or operating times of the motor vehicle can therefore then be ensured. Instructions may likewise be automatically output to a driver of the motor vehicle, for example, in the optimization operating mode in order to set or approach the predefined load requirements or operating points. As a result, the noise optimization can be performed during regular use of the motor vehicle, with the result that the motor vehicle does not have to be additionally brought into a workshop or to a service facility, for example. This may enable particularly flexible, needs-based noise optimization with accordingly less effort for the user of the motor vehicle. The optimization operating mode can be activated manually, for example, with the result that corresponding effort for the noise optimization can be saved when the optimization operating mode is deactivated, that is to say when the motor vehicle is operated outside the optimization operating mode. The optimization operating mode may likewise be activated, for example, automatically, regularly or in response to a detected change in the motor vehicle. This may enable further improved usage comfort.

In this case, at least one embodiment is not based on shifting natural frequencies, but rather on the continuous detection of acoustic excesses, that is to say interfering noises, in the motor vehicle or during operation of the at least one system and a corresponding adaptive, self-learning adaptation of the behavior of the motor vehicle or one or more systems for the motor vehicle, with the result that the excitation of component-specific natural frequencies is avoided or reduced by means of adaptive functional system measures during the usage phase, that is to say ultimately during operation of the motor vehicle. The usage phase may here mean any operation of the motor vehicle, for example initial test operation after manufacture, operation by an end user, operation in a workshop or on a test bench and/or the like. Since the load requirement is also not automatically changed or excluded, this can be understood as meaning that the driver or occupant of the motor vehicle determines its state by predefining or setting load requirement, but the motor vehicle or its self-learning adaptation device determines how this state is achieved or set, that is to say which states or operating parameter values of individual systems, devices or components are used to comply with the load requirement.

At least one embodiment therefore enables vehicle-specific and/or system-specific and permanent noise optimization, in particular even when there is component or manufacturing variation between different motor vehicles or systems that are the same according to the specifications if changes in the acoustic behavior of the motor vehicle and/or the like occur over time. Such changes may occur, for example, on account of wear and/or the use of individual attachments or adaptations, for instance a roof luggage rack or bicycle rack, a spoiler, an adapted shock absorber or chassis, a suspension lift or lowering, changed tires, chip tuning, a load and/or the like. All of this may result in vehicle-specific or situation-specific acoustic excesses at certain operating points which are practically unforeseeable and cannot practically be permanently excluded or prevented from the outset. At least one embodiment therefore makes it possible to achieve noise optimization without, for example, a significantly more robust design of systems and components of the motor vehicle and therefore in a particularly efficient manner on a vehicle-specific basis, permanently, effectively and comfortably. In particular, it is therefore possible to react flexibly to changes in the acoustic behavior of the motor vehicle, on the one hand, and to perform the noise optimization automatically or semi-automatically and therefore in a particularly simple and economical manner for users of the motor vehicle, on the other hand.

It should be noted that varying the at least one operating parameter value does not change an overall or output behavior of the system or the motor vehicle. For example, even when varying the at least one operating parameter value or when using the corresponding new operating strategy, a total output power or a total output torque, a total cooling capacity, a total ventilation capacity, a speed and/or the like of the system or the motor vehicle can remain unchanged in comparison with the original operating parameter value captured and given before the variation.

The noise optimization method proposed in the present case may likewise be used—in an accordingly modified or supplemented form—to generate or amplify a specific target noise. For this purpose, absence of a predefined target noise or a predefined noise characteristic, for example, or a volume of a predefined target noise or a predefined noise characteristic that is below a predefined threshold value, for example, can be detected, for example in a specific frequency range, and at least one operating parameter value of at least one system of the motor vehicle can be varied such that the target noise or the noise characteristic is generated or amplified. This can be carried out in each case, in particular, in a manner corresponding to predetermined loads, load requirements or driving maneuvers. This makes it possible to produce or support, for example, a specific driving impression or a specific driving experience, for example an impression of sportiness when accelerating by generating or amplifying sonorous growling or the like.

In one possible configuration of at least one embodiment, the system comprises at least two at least substantially functionally identical controllable devices. The adaptation device then changes control of the two devices in opposite directions in order to vary the at least one operating parameter value. The functionally identical controllable devices can therefore be provided or configured for the same type of basic functionality. In other words, the functionally identical devices in the present sense can produce, for example, the same type of effect or output, for instance a drive torque, an air flow or the like. The fact that the control of the two devices is changed in opposite directions can mean, in particular, that the corresponding output of one device is reduced and the output of the other device is increased, with the result that a total output or an overall effect of the two devices or of the system comprising these devices remains unchanged and the respective load requirement is therefore still complied with despite the variation or change. Such control or variation of two functionally identical devices in opposite directions may make it possible in a particularly simple manner to vary at least one operating parameter value without deviating from the load requirement, since an effect of the changed control of one of the two devices is immediately compensated for by the opposite, that is to say opposed, change in the control of the other of the two devices.

In one possible development of at least one embodiment, the two devices of the system are in the form of drive devices, in particular electrical drive machines, on different axles of the respective motor vehicle. In other words, a first of the devices can therefore drive a front axle of the motor vehicle, for example, while the other of the two devices can drive a rear axle of the motor vehicle. A torque distribution between the two drive devices is varied here as the operating parameter value. In other words, a load or torque shift between the two drive devices is therefore carried out. In this case, a total torque for driving the motor vehicle can remain unchanged overall. However, as a result of the changed torque distribution, the two drive machines are moved to different individual operating points, as a result of which the operating noise or noise spectrum of the drive machines can be changed. The configuration of at least one embodiment proposed here can enable particularly effective noise optimization, since acoustic excesses are often caused by drive devices, but occur only in relatively narrow rotational speed or load ranges of the drive machines. It is also advantageous here that the corresponding control of the electrical machines can be carried out in a particularly simple and particularly fast manner and in a manner that is at least substantially unnoticeable to the occupants of the motor vehicle.

In a further possible configuration of at least one embodiment, the respective system—at least presumably—causing the excess, that is to say the system at least presumably responsible for the excess, is determined, that is to say identified, on the basis of operating data relating to the motor vehicle during operation of the motor vehicle. The adaptation device then varies the at least one operating parameter value of at least precisely this system. The operating data may be determined for the motor vehicle as a whole or for a plurality of individual systems of the motor vehicle. For example, the system responsible for the excess can then be determined by analyzing the operating or load states of the various systems. In this case, it is possible to take into account, for example, predefined or learnt correlations between certain operating data or operating or load states, operating frequencies of systems or components, acoustic excesses, specific frequencies or frequency ranges of excesses and systems responsible for the excesses and/or the like. The operating data may indicate or comprise, for example, a rotational speed, a torque, a temperature, a switching state, a control frequency, a duty ratio, an operating mode and/or the like. Various operating modes in this sense may be all-wheel operation in comparison with front or rear axle drive, for example for a drive, or external air operation in comparison with an air circulation mode, for example for a ventilation system or the like.

Provision may be made here for the operating parameter values of the identified system causing the excess to be varied exclusively or first until the acoustic excess has been reduced or the scope for variation has been exhausted. If no reduction or no sufficient reduction can be achieved, operating parameter values of one or more further systems of the motor vehicle can be gradually automatically varied. In this case, the various systems of the motor vehicle can be run through, for example, on the basis of a spatial vicinity or a degree of mechanical and/or electrical coupling to the identified system or according to a predefined order or matrix. Varying only or at least first the operating parameter value of the identified system may be a particularly targeted and therefore particularly effective and fast measure which may have a particularly high predisposition to success in terms of effectively reducing the acoustic excess. However, there may be cases in which the system responsible is wrongly identified or the excess can be reduced, for example, only by varying an operating parameter value of another system or of a plurality of systems. This may be the case, for example, during complex interaction of a plurality of systems as a cause of the acoustic excess. If no sufficient reduction is achieved during an instance of the respective corresponding load requirement or acoustic excess before the scope for variation of all variable operating parameters has been run through or searched, the variation, that is to say the search for an acoustically optimum operating strategy, can be continued in the next instance, that is to say the next time the corresponding load requirement or acoustic excess occurs. Particularly effective noise optimization can therefore be ultimately achieved.

In one possible development of at least one embodiment, the system causing the excess is determined, that is to say identified, on the basis of at least one predefined characteristic diagram. Such a characteristic diagram may indicate acoustically critical ranges of one or more operating parameters, volumes or interference frequencies that are linked to various systems and/or occurred in the past for various operating parameter values and/or the like. The system responsible in each case can be directly determined therefrom. For example, multiples or divisors, that is to say higher or lower orders, of the frequencies indicated in the characteristic diagram may likewise be compared with the detected acoustic excess or its frequency in order to infer the system responsible in each case. The volume or sound intensity may be plotted or indicated against a torque, a rotational speed and a temperature and/or the like as dimensions of the characteristic diagram, for example. One characteristic diagram for the motor vehicle and/or a plurality of characteristic diagrams for an individual system in each case or an individual component of the motor vehicle may be predefined. A corresponding characteristic diagram may be generated and predefined, for example, by means of corresponding measurements when developing or manufacturing the motor vehicle. If changes and therefore deviations from the initial characteristic diagram then occur over time, the characteristic diagram can still be used or taken into account, for example by identifying the respective responsible system on the basis of that peak indicated in the characteristic diagram which is closest to the frequency of the detected acoustic excess by means of a pattern comparison of frequency peaks or spectra and/or the like. The use of at least one characteristic diagram, as proposed here, may make it possible to identify the respective responsible system, that is to say the system causing the respective acoustic excess, in a particularly simple and fast manner.

In a further possible configuration of at least one embodiment, the acoustic signals are captured by means of a plurality of acoustic sensors arranged in a spatially distributed manner. Such acoustic sensors may be or comprise, for example, microphones, vibration sensors, bending sensors, acceleration sensors and/or the like. These acoustic sensors may be permanently installed in the motor vehicle as part of the latter. Additionally or alternatively, an acoustic sensor of a mobile electronic device coupled to the motor vehicle, for example a mobile telephone or a navigation device or the like, can be used, for example. If the method is used for a separate system, the acoustic sensors may be arranged on the system or around the system or integrated in it, for example. The use of acoustic sensors may make it possible to detect acoustic excesses in a particularly reliable manner and in a manner relevant to the occupants of the motor vehicle, since, for example, the detection of acoustic excesses is then not dependent or need not be based on an acoustic model of the motor vehicle or assumed acoustic reactions of the motor vehicle to a particular operating behavior. In particular, at least one acoustic sensor may be arranged in or at a passenger compartment of the motor vehicle. Actual noise to which the vehicle occupants are exposed can therefore then be captured. This allows particularly accurate and reliable detection of acoustic excesses that are actually relevant to the vehicle occupants and comfort. The use of a plurality of acoustic sensors arranged in a spatially distributed manner may make it possible to locate a corresponding sound source or identify the respective causative system in a particularly accurate and reliable manner.

In a further possible configuration of at least one embodiment, during operation of the motor vehicle, a user setting of at least one device of the motor vehicle, which can influence a noise level in a passenger compartment of the motor vehicle, is captured. Such a user setting may be or comprise, for example, a degree of opening or closed state of a side window, a setting for an air flow or ventilation intensity of a ventilation device, a volume of a media playback device, for instance a radio or multimedia devices or the like, and/or the like. In the configuration of at least one embodiment proposed here, the at least one operating parameter is automatically varied by the adaptation device only when the noise level generated by the user setting in the passenger compartment is less than a predefined threshold value and/or a noise corresponding to the acoustic excess is not drowned out by the noise level generated by the user setting. This is based on the knowledge that acoustic excesses caused by other systems of the motor vehicle may be drowned out by corresponding user settings, for instance an accordingly loud music playback, or by wind noises that occur when the side window is open at an appropriate speed of the motor vehicle, with the result that reducing such an acoustic excess would effectively have no effect whatsoever, that is to say in the perception of the vehicle occupants. Varying the operating parameter value can therefore then be dispensed with in such situations. Efficiency losses associated with varying the operating parameter value can therefore possibly be avoided without occupant or usage comfort being reduced.

A further aspect of at least one embodiment is an assistance system for a motor vehicle. The assistance system according to at least one embodiment has a data processing device and is configured to carry out the method according to at least one embodiment, in particular automatically or semi-automatically. For this purpose, the data processing device may comprise, for example, a process device, that is to say for instance a microchip, a microprocessor or a microcontroller or the like, and a computer-readable data memory coupled thereto. This data memory may store an operating or computer program which codes or implements the method steps, sequences or measures or corresponding control instructions described in connection with the method according to at least one embodiment. This operating or computer program can then be executed by the process device in order to carry out the corresponding method or to cause or prompt it to be carried out. The assistance system according to at least one embodiment may be or comprise or implement, in particular, the adaptation device mentioned in connection with the method according to at least one embodiment. The assistance system according to at least one embodiment may likewise comprise, for example, an input interface for capturing the acoustic signals, a corresponding acoustic signal analysis device—implemented in hardware and/or software—for detecting acoustic excesses, one or more acoustic sensors for recording the acoustic signals, an output interface for outputting control signals for varying the at least one operating parameter value and/or the like.

A further aspect of at least one embodiment is a motor vehicle having at least one controllable system, which can generate or excite sound or acoustic oscillations or vibrations directly or indirectly during operation, and an assistance system according to at least one embodiment for optimizing noise in the motor vehicle or the at least one controllable system. The motor vehicle according to at least one embodiment may be or correspond to, in particular, the motor vehicle mentioned in connection with the method according to at least one embodiment and/or in connection with the assistance system according to at least one embodiment. Accordingly, the motor vehicle according to at least one embodiment may have some or all of the properties and/or features mentioned in these contexts.

Additional features of one or more embodiments may emerge from the claims, the figures and the description of the figures. The features and combinations of features mentioned above in the description and the features and combinations of features shown below in the description of the figures and/or in the figures alone can be used not only in the respectively stated combination but also in other combinations or alone, without departing from the scope of the invention.

DETAILED DESCRIPTION OF THE DRAWINGS

Figure 1:
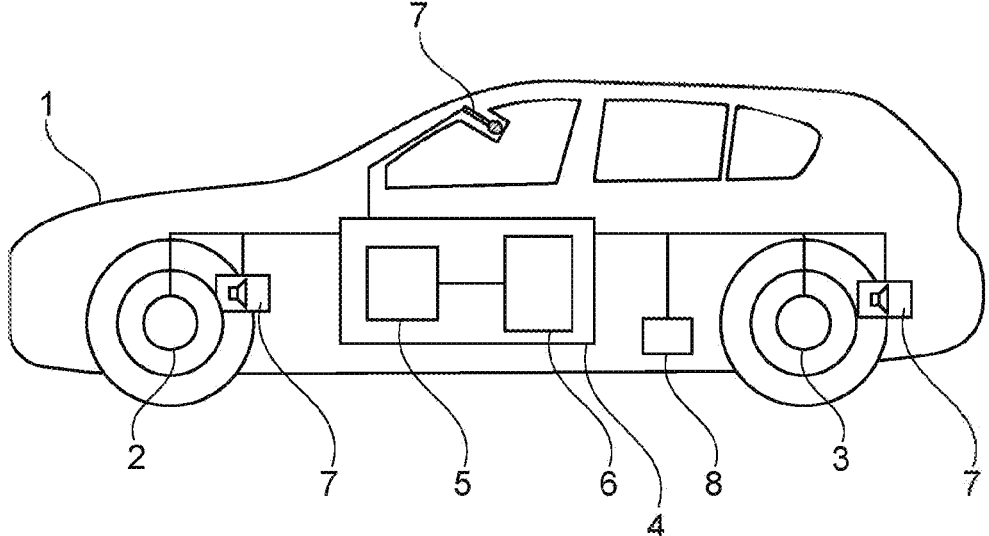
FIG. 1 shows a partial schematic illustration of a motor vehicle having an assistance system for optimizing noise.

FIG. 1 shows a partial schematic illustration of a motor vehicle 1. The motor vehicle 1 is equipped here with an electrical drive system comprising an electric front motor 2 on a front axle and an electric rear motor 3 on a rear axle. During operation of the motor vehicle 1, acoustic excesses, that is to say interfering noises, may occur, in particular in limited frequency ranges or in the form of individual frequency peaks. Their reliable and permanent avoidance cannot be practically achieved during the series manufacture of corresponding motor vehicles 1, for example on account of individual deviations, for instance different equipment variants, a variation of properties of individual components or systems, different aging influences and/or the like. In order to nevertheless optimize noise, the motor vehicle 1 is equipped here with a self-learning assistance system 4 for optimizing noise during operation of the motor vehicle 1. The assistance system 4 comprises, in a schematically indicated manner, a processor 5 and a computer-readable data memory 6. The assistance system 4 may likewise have further and/or other components.

The motor vehicle 1 also has a plurality of acoustic sensors 7 arranged in a distributed manner. Acoustic signals are therefore recorded during operation of the motor vehicle 1 and are then processed by the assistance system 4 and analyzed for an acoustic excess. The assistance system 4 also captures state data which can indicate a current load requirement, current states or operating parameter values of one or more systems of the motor vehicle 1, for example the drive system, and/or the like. These state data may be determined or provided, for example, by a corresponding state sensor system 8 indicated purely schematically here. The state sensor system 8 may comprise, for example, one or more sensors, control devices, switching devices and/or the like.

The assistance system 4 continuously identifies acoustically critical operating points during operation on the basis of the captured data. Furthermore, the assistance system 4 can then identify at least one system of the motor vehicle 1 which is at least presumably or probably responsible, for example using a machine learning method, on the basis of a predefined characteristic diagram and/or the like.

The assistance system 4 can then automatically change or vary at least one operating parameter value by means of appropriate intelligent control of this system or of individual components or devices of this system, for example the front motor 2 and the rear motor 3, in order to reduce the detected acoustic excess. In the present case, a torque shift between the front motor 2 and the rear motor 3 may be carried out for this purpose, for example, but a total torque of the drive system according to a respectively current load requirement remains unchanged. This makes it possible to achieve the situation in which an acoustic excess caused, for example, by the front motor 2 or the rear motor 3 or a vibration excitation of the respective axle, that is to say a corresponding acoustic abnormality, can then be avoided or reduced. For example, control of an air-conditioning or heat management system of the motor vehicle 1 may likewise be changed accordingly in order to change a temperature which may likewise result in the acoustic excess being avoided or reduced. Blowers or fans, air or mixing flaps, a differential and/or the like may likewise be controlled accordingly in a changed manner, for example.

In this case, the assistance system 4 is self-learning. This means here that the assistance system 4 checks, in response to a change made to at least one operating parameter value, whether and to what extent this has led to a change in the respective detected acoustic excess, that is to say in particular noise optimization. The operating parameter value and/or at least one further operating parameter value can then be changed further and resulting changes in the acoustic behavior of the motor vehicle 1 can be checked or observed again. In this case, a reduction in acoustic excesses, that is to say for example an adjustment of peaks or a homogenization of an energy distribution in an acoustic spectrum or the like, may be specified as the optimization goal. In this manner, the assistance system 4 can automatically and independently learn which operating parameter values or which changes to which operating parameter values can achieve noise optimization. This may be learnt individually or specifically in each case for certain load requirements or operating points of the motor vehicle 1 or one or more systems of the motor vehicle.

The operating parameter values learnt for noise optimization can then be automatically used in future—by the assistance system 4 and/or by the corresponding system whose operating parameter value was varied—if a corresponding load requirement or a corresponding operating point occurs or is set again.

Figure 2:
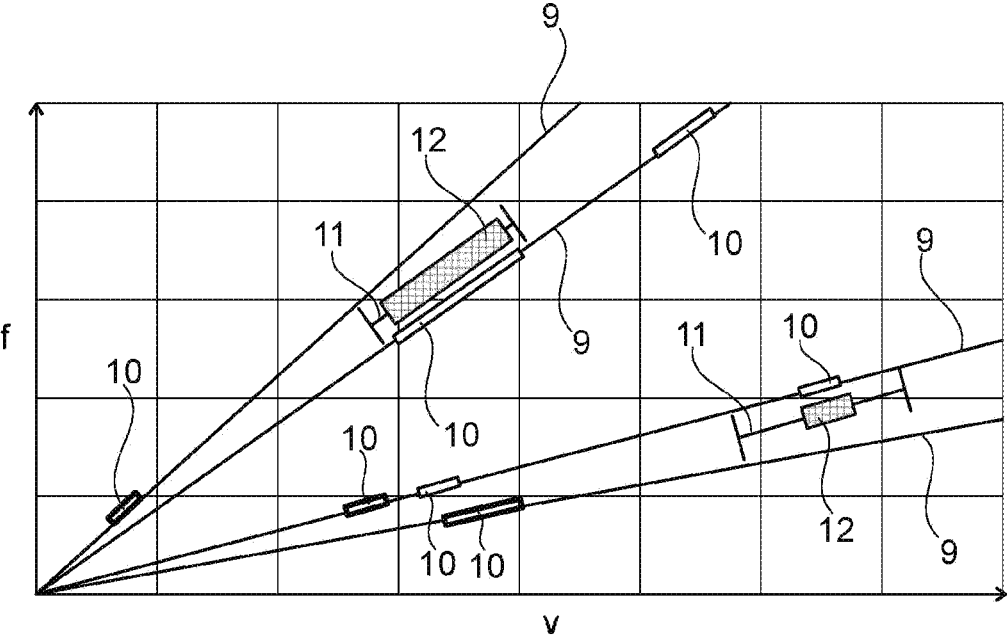
FIG. 2 shows an exemplary schematic diagram illustration for illustrating acoustic problem areas.

For further illustration, FIG. 2 shows an exemplary schematic diagram illustration in which a sound frequency f is plotted on an ordinate axis and a speed v of the motor vehicle 1 is plotted on an abscissa axis. A plurality of speed/frequency profiles 9 are illustrated therein. These indicate which sound frequencies f can occur at various speeds v. However, not all noises and sound frequencies f are disruptive. Rather, there may be individual interference ranges 10 in which particularly loud noises at the corresponding sound frequency f or a frequency spectrum perceived as particularly unpleasant can occur, for example. The various interference ranges 10 may occur at different operating points or in different operating modes, for example when constantly driving with a low or high engine load, during acceleration through the respective speed range or the like.

Changing at least one operating parameter value then makes it possible to achieve the situation in which a certain speed v, at which one of the interference ranges 10 occurs, can be set or maintained by means of changed control of the front motor 2 and of the rear motor 3, with the result that the respective interference range 10 can then be avoided or circumvented at this speed.

By way of example, scatter bands 11 of individual components of the motor vehicle 1 are illustrated here for two of the interference ranges 10. The scatter bands 11 illustrate possible differences in the acoustic behavior of the same component in different motor vehicles 1 by way of variation, that is to say characteristics of the components that are within the predefined tolerances or specifications. A typical component behavior 12, which is exhibited by the majority of corresponding components, for example of a vehicle fleet, is also illustrated in each case. The scatter bands 11 extend here beyond the corresponding interference ranges 10 determined, for example, for the bulk of components. This illustrates that the acoustic behavior of a plurality of motor vehicles 1 which are identical per se may be different as a result of component variation and accordingly may require different optimization measures. This is taken into account here by the vehicle-internal and therefore also vehicle-specific noise optimization by the respective self-learning assistance system 4.

Overall, the described examples show how acoustic excesses of components can be adaptively avoided during operation of a vehicle.

LIST OF REFERENCE SIGNS

1 Motor vehicle
2 Front motor
3 Rear motor
4 Assistance system
5 Processor
6 Data memory
7 Acoustic sensor
8 State sensor system
9 Speed/frequency profile
10 Interference range
11 Scatter band
12 Typical component behavior
V Driving speed
f Interference frequency.

The invention claimed is:

1. A method for optimizing noise in a motor vehicle, comprising:

automatically, during operation of the motor vehicle, capturing and analyzing acoustic signals for acoustic excess;

in response to detecting an acoustic excess via the analysis, capturing a current load requirement and at least one current operating parameter value for at least one motor vehicle system that complies with the load requirement;

varying at least one operating parameter, with continued compliance with the load requirement, by a self-learning adaptation device so as to reduce the acoustic excess;

in response to the reduction of the acoustic excess, setting a corresponding new operating parameter as a new operating strategy for the motor vehicle system for complying with the respective load requirement, wherein the new strategy is set to be used in response to the occurrence of the respective load requirement;

performing noise optimization in a predefined optimization operating mode of the motor vehicle in which different predefined load requirements are run through in a predefined program, wherein the system comprises at least two functionally identical controllable devices, and wherein the adaptation device changes control of the two devices in opposite directions in order to vary the at least one operating parameter value.

2. The method of claim 1, wherein the devices are electrical drive machines on different axles of the motor vehicle, and wherein a torque distribution between the two drive machines is varied as the operating parameter value.

3. The method of claim 1, wherein the system causing the excess is determined on the basis of operating data relating to the motor vehicle during operation of the motor vehicle, and wherein the adaptation device then varies the at least one operating parameter value of at least precisely this system.

4. The method of claim 3, wherein the system causing the excess is determined on the basis of a predefined characteristic diagram.

5. The method of claim 1, wherein the acoustic signals are captured by means of a plurality of acoustic sensors arranged in a spatially distributed manner.

6. The method of claim 1, wherein during operation of the motor vehicle, a user setting of: a degree of opening of a side window, an air flow intensity of a ventilation device and/or a volume of a media playback device, is captured, and wherein the at least one operating parameter value is varied only when the noise level generated by the user setting is less than a predefined threshold value and/or noise corresponding to the acoustic excess is not drowned out by the noise level generated by the user setting.

7. An assistance system for a motor vehicle, which has a data processing device and is configured to carry out the method of claim 1.

8. A motor vehicle comprising:

at least one controllable system configured to generate sound during operation; and the assistance system of claim 7.

9. A method for optimizing noise in a motor vehicle, comprising:

automatically, during operation of the motor vehicle, capturing and analyzing acoustic signals for acoustic excess;

in response to detecting an acoustic excess via the analysis, capturing a current load requirement and at least one current operating parameter value for at least one motor vehicle system that complies with the load requirement;

varying at least one operating parameter, with continued compliance with the load requirement, by a self-learning adaptation device so as to reduce the acoustic excess;

in response to the reduction of the acoustic excess, setting a corresponding new operating parameter as a new operating strategy for the motor vehicle system for complying with the respective load requirement, wherein the new strategy is set to be used in response to the occurrence of the respective load requirement;

performing noise optimization in a predefined optimization operating mode of the motor vehicle in which different predefined load requirements are run through in a predefined program, wherein during operation of the motor vehicle, a user setting of: a degree of opening of a side window, an air flow intensity of a ventilation device and/or a volume of a media playback device, is captured, and wherein the at least one operating parameter value is varied only when the noise level generated by the user setting is less than a predefined threshold value and/or noise corresponding to the acoustic excess is not drowned out by the noise level generated by the user setting.

\* \* \* \* \*